United States Patent
Lee et al.

(10) Patent No.: US 12,023,651 B2
(45) Date of Patent: Jul. 2, 2024

(54) CATALYST FOR SELECTIVE RING-OPENING REACTION AND METHOD OF USING SAME

(71) Applicants: SK INNOVATION CO., LTD., Seoul (KR); SK ENMOVE CO., LTD., Seoul (KR)

(72) Inventors: Seung Woo Lee, Daejeon (KR); Hee Jung Jeon, Daejeon (KR); Yeon Ho Kim, Daejeon (KR); Yoon Kyung Lee, Daejeon (KR); Seon Ju Lim, Daejeon (KR)

(73) Assignees: SK INNOVATION CO., LTD. (KR); SK ENMOVE CO., LTD. (KR)

( * ) Notice: Subject to any disclaimer, the term of this patent is extended or adjusted under 35 U.S.C. 154(b) by 0 days.

(21) Appl. No.: 17/952,605

(22) Filed: Sep. 26, 2022

(65) Prior Publication Data
US 2023/0130836 A1    Apr. 27, 2023

(30) Foreign Application Priority Data
Oct. 25, 2021   (KR) .................. 10-2021-0142897

(51) Int. Cl.
| | | |
|---|---|---|
| *B01J 35/69* | (2024.01) | |
| *B01J 21/16* | (2006.01) | |
| *B01J 23/42* | (2006.01) | |
| *B01J 29/00* | (2006.01) | |
| *B01J 29/04* | (2006.01) | |
| *B01J 35/00* | (2006.01) | |
| *B01J 35/64* | (2024.01) | |
| *B01J 35/66* | (2024.01) | |
| *C10G 45/62* | (2006.01) | |
| *C10G 45/64* | (2006.01) | |

(52) U.S. Cl.
CPC .............. *B01J 23/42* (2013.01); *B01J 21/16* (2013.01); *B01J 29/005* (2013.01); *B01J 29/044* (2013.01); *B01J 35/00* (2013.01); *B01J 35/651* (2024.01); *B01J 35/653* (2024.01); *B01J 35/695* (2024.01); *C10G 45/62* (2013.01); *C10G 45/64* (2013.01); *B01J 2523/828* (2013.01)

(58) Field of Classification Search
CPC ...... C10G 45/62; C10G 45/64; C10G 65/043; C10G 69/02; C10G 2400/10; C10M 169/04; C10M 169/06; C10M 171/02; B01J 2523/828; B01J 21/16; B01J 23/42; B01J 2229/18; B01J 2229/186; B01J 2229/20; B01J 2229/42; B01J 2029/062; B01J 29/061; B01J 29/064; B01J 29/068; B01J 29/005; B01J 29/126; B01J 29/076; B01J 29/7461; B01J 29/74; B01J 35/1033; B01J 35/108; B01J 35/109; B01J 35/1095; B01J 35/1052; B01J 37/0018; B01J 37/0201; B01J 37/04; B01J 37/08; B01J 37/0009; B01J 37/0036; B01J 35/651; B01J 35/653; B01J 35/695
USPC ......... 502/60, 63, 64, 66, 67, 68, 69, 79, 74
See application file for complete search history.

(56) References Cited

U.S. PATENT DOCUMENTS

| | | |
|---|---|---|
| 5,393,408 A | 2/1995 | Ziemer et al. |
| 5,763,731 A | 6/1998 | McVicker et al. |
| 6,322,692 B1 | 11/2001 | Cody et al. |
| 6,652,737 B2 | 11/2003 | Touvelle et al. |
| 6,783,661 B1 | 8/2004 | Briot et al. |
| 2002/0040175 A1 | 4/2002 | Baird, Jr. et al. |
| 2007/0138054 A1 | 6/2007 | Palmer et al. |
| 2008/0249346 A1 | 10/2008 | Galperin et al. |
| 2014/0124410 A1 | 5/2014 | Rayo Mayoral et al. |
| 2015/0367332 A1* | 12/2015 | Kuvettu ................ B01J 35/651 502/66 |
| 2018/0148657 A1 | 5/2018 | Rayo Mayoral et al. |

FOREIGN PATENT DOCUMENTS

| | | |
|---|---|---|
| KR | 100697486 B1 | 3/2007 |
| KR | 100711294 B1 | 4/2007 |
| KR | 100729285 B1 | 6/2007 |
| KR | 101266208 B1 | 5/2013 |
| KR | 20180132101 A | 12/2018 |
| KR | 20190087480 A | 7/2019 |
| MX | 2012012877 A | 10/2013 |
| WO | 0071645 A1 | 11/2000 |
| WO | 0118156 A1 | 3/2001 |
| WO | 2007033467 A1 | 3/2007 |
| WO | 2017172572 A1 | 10/2017 |
| WO | 2018098028 A1 | 5/2018 |

OTHER PUBLICATIONS

Machine Translation of CN 108047051A, May 18, 2018.*
Machine Translation of CN 102690683A, Sep. 26, 2012.*
Machine Translation of CN 103773447A, May 7, 2014.*
Machine Translation of CN 1978593A, Jun. 13, 2007.*
EP22194627.0 European Search Report dated Mar. 7, 2023, 7 pgs.

* cited by examiner

*Primary Examiner* — Elizabeth D Wood
(74) *Attorney, Agent, or Firm* — Bracewell LLP; Brad Y. Chin

(57) ABSTRACT

The present disclosure provides a catalyst for SRO reactions. The catalyst includes a solid acid material and a metal. In this case, pores of the catalyst corresponding to at least 20% of the total pore volume of the catalyst have a pore size of 10 nm or more. The present disclosure also provides a method of using the catalyst.

15 Claims, 3 Drawing Sheets

FIG. 1

| type of compound | structure | VI | Pour | oxidation stability | toxicity |
|---|---|---|---|---|---|
| n-paraffin(wax) | | very high ~175 | solid @50°C | excellent | low |
| iso-paraffins with branched chain | | high ~150 | good | excellent | low |
| iso-paraffin with highly branched chain (PAO) | | good ~130 | good | excellent | low |
| cyclo-paraffin-single ring with long chain | | good ~130 | good | good | low |
| polycondensed naphthene | | bad ~60 | good | average | low |
| monoaromatic with long chain | | bad ~60 | good | average | average |
| polyaromatic | | very bad <0 | good | very bad | very high | ns # CATALYST FOR SELECTIVE RING-OPENING REACTION AND METHOD OF USING SAME

CROSS REFERENCE TO RELATED APPLICATION

The present application claims priority to Korean Patent Application No. 10-2021-0142897, filed Oct. 25, 2021, the entire contents of which is incorporated herein for all purposes by this reference.

BACKGROUND

1. Field of the Invention

The present disclosure relates to a catalyst for selective ring-opening (SRO) reactions and a method of using the same. More particularly, the present disclosure relates to a catalyst for SRO reactions that can be used in lube base oil preparation processes and to a method of applying the catalyst to lube base oil preparation processes.

2. Description of the Related Art

Lube base oil is a raw material for lubricants. In general, good lube base oils have a high viscosity index (VI), high stability (resistant to oxidation, heat, UV, etc.), and low volatility. The American Petroleum Institute (API) classifies lube base oils as shown in Table 1 below according to their quality, such as sulfur content, saturation, and VI.

TABLE 1

| Classification | Sulfur content (%) | Saturate (%) | VI |
|---|---|---|---|
| Group I | >0.03 | <90 | 80-120 |
| Group II | ≤0.03 | ≥90 | 80-120 |
| Group III | ≤0.03 | ≥90 | 120 or more |
| Group IV | All poly alpha olefins (PAOs) | | |
| Group V | All other lube base oils not included in Group I, II, III, or IV | | |

Lube base oils classified into Group IV are highest-quality oils, and their quality is lowered from Group IV to Group I. Higher-quality lube base oils have a lower sulfur and nitrogen content, higher VI, lower pour point, lower CCS viscosity, and lower Noack volatility. In addition, the higher the quality of the lube base oil, the higher the paraffin content, and the lower the naphthenic content and the aromatic content.

The VI is one of the important physical properties for assessing the quality of lube base oils. The VI is an index related to changes in viscosity related to changes in temperature. The higher the VI, the smaller the change in viscosity for the change in temperature. Therefore, a lube base oil having a high VI is advantageous in terms of engine protection due to its relatively high viscosity at high temperatures, and it is advantageous in terms of driving an engine pump due to its relatively low viscosity at low temperatures. For this reason, lube base oils with a high VI are rated as higher-quality base oils. In addition, there is a growing market demand for lube base oils (hereinafter, referred to as Group III+ lube base oils) having a higher VI than Group III oils.

There are two primary methods known for producing lube base oils having a higher VI than Group III oils. They are i) preparation of synthetic base oils (Group IV) from chemical raw materials, and structural isomerization reaction with a feed (starting material) having a high paraffin content. However, in the case of i), there are problems that raw materials are expensive compared to mineral oil-based lube base oils, and the amount of raw materials that can be used is small. Therefore, the influence on the market is insignificant. In the case of there is a problem that it is difficult to obtain an oil with a high paraffin content that can be used as a feed. This makes it difficult to supply large quantities to the market.

PRIOR ART LITERATURE

Patent Literature (Patent Literature 1) KR 10-2018-0132101 A1

SUMMARY

Accordingly, the present disclosure is to suggest a new solution to enable mass supply of lube base oils with high VI to the market. A first aspect of the present disclosure is to provide a catalyst for SRO reactions. A second aspect of the present disclosure is to provide a method of enhancing the VI of a lube base oil by using a catalyst of the first aspect. A third aspect of the present disclosure is to provide a method of preparing a lube base oil by using the catalyst of the first aspect.

A catalyst for SRO reactions to achieve the first aspect of the present disclosure includes a solid acid material and a metal, wherein pores of the catalyst corresponding to a 20% or more pore volume with respect to the total pore volume of the catalyst have a pore size of 10 nm or more.

According to one embodiment of the present disclosure, the solid acid material comprises a first solid acid material and a second solid acid material, the first solid acid material having a pore size of 1 nm or less, and the second solid acid material having a pore size of greater than 1 nm.

According to one embodiment of the present disclosure, the first solid acid material comprises a zeolite, crystalline aluminosilicate, silica-alumina-phosphate (SAPO), aluminum phosphate (AlPO), a metal organic framework (MOF), or a combination thereof.

According to one embodiment of the present disclosure, the second solid acid material comprises silica-alumina (amorphous silica-alumin, ASA), clay, zirconia sulfated, zirconia, titania, niobia, alumina, silica, or a combination thereof.

According to one embodiment of the present disclosure, the metal is a Group VIII metal.

According to one embodiment of the present disclosure, the catalyst comprises the metal in an amount of 0.05% to 5% by weight with respect to the total weight of the catalyst.

According to one embodiment of the present disclosure, the catalyst further comprises a non-acidic binder.

According to one embodiment of the present disclosure, the catalyst comprises, with respect to 100 parts by weight of the second solid acid material, 10 to 100 parts by weight of the first solid acid material and 10 to 100 parts by weight of the non-acidic binder.

According to one embodiment of the present disclosure, the catalyst further comprises a promoter, in which the promoter comprises an alkali metal, an alkaline earth metal, a Group Vb metal, a Group VIb metal, Sn, or a combination thereof.

A method of increasing the VI of a lube base oil to achieve the second aspect of the present disclosure comprises subjecting a reactant to a SRO reaction in the presence of the catalyst of the first aspect of the present disclosure.

According to one embodiment of the present disclosure, the reactant includes: a feed for preparation of a lube base oil; an intermediate oil in a lube base oil preparation process; or a lube base oil.

According to one embodiment of the present disclosure, the SRO reaction is carried out in the presence of hydrogen within a temperature in the range of from 100° C. to 450° C.

A method of preparing a lube base oil to achieve the third aspect of the present disclosure comprises the steps of: a) preparing a feed; b) introducing the feed into any one of a hydrodewaxing (HDW) reaction and a SRO reaction; and c) introducing the reaction product of step b) into the remaining one of the HDW reaction and the SRO reaction, in which the SRO reaction is carried out in the presence of the catalyst according to the first embodiment of the present disclosure.

According to one embodiment of the present disclosure, the method further comprises d) introducing the reaction product of step c) into a hydrofinishing (HDF) reaction.

According to one embodiment of the present disclosure, the VI of the lube base oil prepared by the method is greater than the VI of the lube base oil prepared by a lube base oil preparation method in which no SRO reaction is carried out by at least 5.

It is possible to prepare lube base oils having increased VI using a wider range of feeds by using the catalysts of the present disclosure.

BRIEF DESCRIPTION OF THE DRAWINGS

FIG. 1 is a schematic illustration of the properties of each lube base oil according to the types of chemicals constituting the lube base oils.

DETAILED DESCRIPTION

Figure 2:
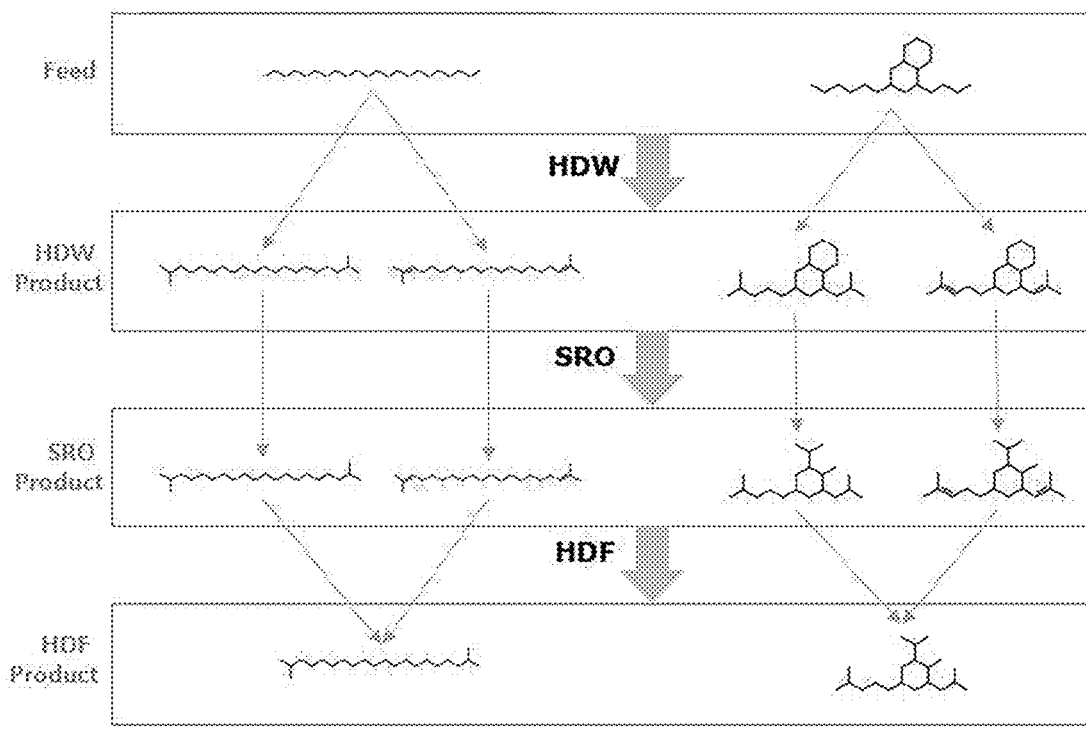
FIG. 2 is a schematic illustration of structural changes in hydrocarbon compounds at each stage when a lube base oil preparation method according to one embodiment of the present disclosure is performed according to the defined sequence in the method.

The above and other objectives, features, and advantages of the present disclosure will be more clearly understood from the following detailed description taken in conjunction with the accompanying drawings, but the present disclosure is not limited thereto. In describing the present disclosure, when the detailed description of the relevant known technology is determined to unnecessarily obscure the gist of the present disclosure, the detailed description may be omitted.

The VI described above is influenced by the type of a hydrocarbon compound present in a lube base oil. Specifically, the VI of the lube base oil may vary depending on the content of paraffin compound/naphthenic compound/aromatic compound in the lube base oil. It is generally known that the higher the content of the compounds in order of paraffin >naphthenic >aromatic, the higher the VI. The properties of each of the lube base oils according to the types of chemical compounds is shown in FIG. 1.

Referring to FIG. 1, the top four compounds have a high paraffin content and a low naphthenic and aromatic content, thereby having an excellent VI. Therefore, with the use of these compounds, it is possible to prepare Group III+ lube base oils. However, as noted above, the amount of the top four compounds of FIG. 1 obtained from crude oil is very limited.

The present disclosure is directed to providing a method for the preparation of Group III+ lube base oils using the top four compounds of FIG. 1 as well as the bottom three compounds as feeds for the preparation of lube base oils.

Catalyst for SRO Reactions

The present disclosure provides a catalyst for SRO reactions that is capable of selectively opening some of the rings compounds in a feed for the preparation of a lube base oil. The SRO reaction opens the ring of naphthene or an aromatic compound in the feed and converts the naphthene or the aromatic compound to a branched paraffin. This makes it possible to obtain lube lase oils having a higher VI than conventional tube base oils from the same feed.

In the present disclosure, "selective ring-opening (SRO)" means preferentially cracking a carbon-carbon bond constituting a cyclic compound in a hydrocarbon compound having two or more rings to a carbon-carbon bond constituting the main chain and a carbon-carbon bond constituting a branch hydrocarbon connected to the cyclic compound. The ring opening reaction of the present disclosure aims to minimize cracking the carbon bonds that make up the main chain, and to selectively open only the carbon bonds that make up a cyclic compound, thereby maintaining the properties and yield of the lube base oil.

An SRO reaction catalyst according to the present disclosure is a bi-functional catalyst including a solid acid material and a metal. While not being bound by any particular theory, it is expected that in the present disclosure, the SRO reactions may include reactions carried out through mechanisms such as those exemplified below.

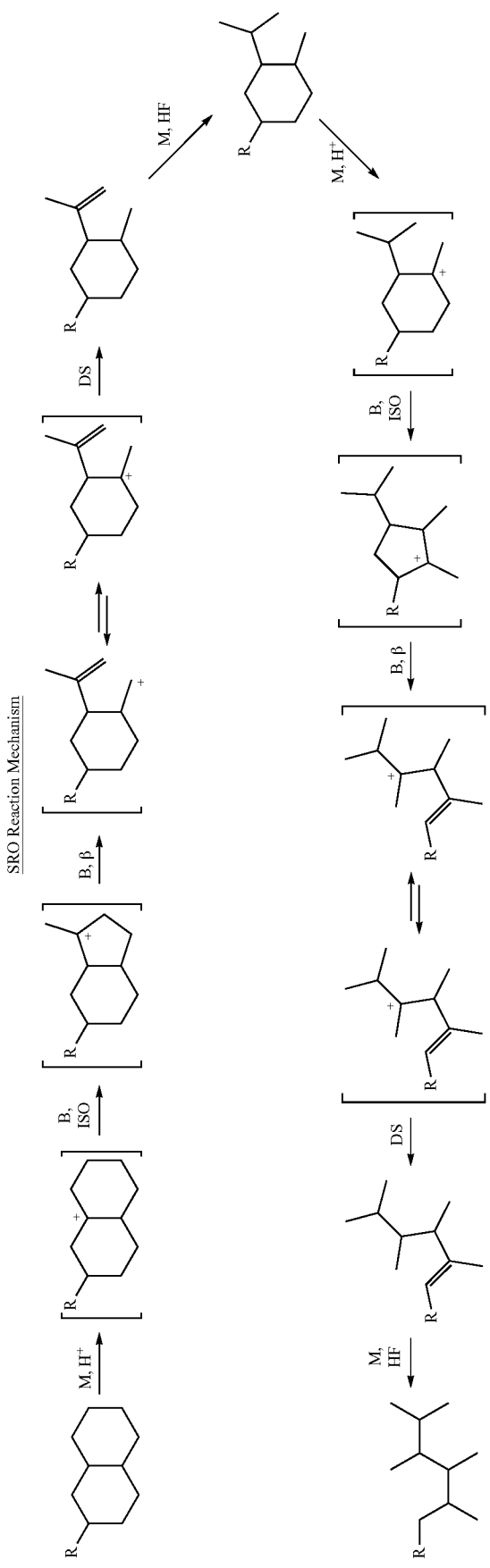

In the mechanism, the function of the metal catalyst is required for the dehydrogenation and, hydrofinishing reactions, and the function of the acid catalyst is required for the isomerization and β-cutting tractions, and it is expected that the metal and the solid acid used in the catalyst of the present disclosure may each fulfill the respective functions.

In the present disclosure, the solid acid material refers to a solid material having a Brönsted acid site or a Lewis acid site. According to one embodiment of the present disclosure, the solid acid material may include a first solid acid material and a second solid acid material. The first solid acid material has a pore size of about 1 nm or less and the second solid acid material has a pore size of greater than about 1 nm. In the present disclosure, the pore size of the second solid acid material may preferably be in the range of from greater than about 1 nm to 100,000 nm. More preferably, the pore size may be about 10 nm or more to about 100,000 nm or less.

According to one embodiment of the present disclosure, the first solid acid material comprises a zeolite, crystalline aluminosilicate, silica-alumina-phosphate (SAPO), aluminum phosphate (AlPO), a metal organic framework (MOF), or a combination thereof. The zeolite may be, for example, SAPO-11, SAPO-41, ZSM-5, ZSM-12, ZSM-23, ZSM-48, FAU, BETA, or MOR.

The first solid acid material is responsible for the treatment of compounds (for instance, a paraffin-based compound or a single ring compound) other than multiple-ring compounds in the feed and may contribute to increasing the selectivity of the second solid acid material for treatment of the multiple ring-compounds.

According to one embodiment of the present disclosure, the second solid acid material may comprise silica-alumina (amorphous silica-alumina, ASA), clay, zirconia sulfated, zirconia, titania, niobia, alumina, silica, or a combination thereof.

In the present disclosure, the second solid acid material may be clay. The clay may be, but is not limited to, kaolinite, monmorillonite, smectite, illite, chlorite, vermiculite, talc, pyrophyllite, and the like, or may be a combination of the foregoing. In the present disclosure, the clay may be kaolinite.

Multiple-ring compounds may be bulk in volume as compared to single-ring compounds or paraffin-based hydrocarbon compounds due to the presence of a plurality of rings. Because of the relatively small pore size of the first solid acid material, the multiple-ring compounds are difficult to have access to the active site of the first solid acid material, and thus the first solid acid material fails to induce a SRO reaction of the multiple-ring compounds. The second solid acid material, on the other hand, has a relatively large pore size compared to the first solid acid material. Accordingly, the SRO reaction of the multiple-ring compounds can be carried out within the pores of the second solid acid material.

The solid acid materials of the present disclosure may also function as a carrier and/or a binder. The solid acid material serves as a carrier and thus functions to support a metal component included in the catalyst of the present disclosure. The solid acid material may also serve as a binder and contribute to forming of the catalyst having sufficient strength so that that the catalyst of the present disclosure can be stably used in high temperature, high pressure reactors.

According to other embodiments of the present disclosure, the catalyst may further include a non-acidic carrier and/or binder. In the present disclosure, the term "non-acidic carrier and binder" refers to a material that does not function as an acid catalyst but can function as a carrier or binder, unlike the solid acid material. The non-acidic carrier and binder may be used additionally in the present disclosure to make the catalyst stable. For example, the non-acidic binder may comprise carbon, silicon carbide, pseudo boehmite, or a mixture thereof.

In addition, the catalyst of the present disclosure comprises a metal. According to one embodiment of the present disclosure, the metal may be a Group VIII metal. Preferably, the metal may be Pt, Pd, Ru, Ir, Ni, Co, Fe, or a combination thereof. In the event that a SRO reaction including a reaction following the SRO reaction mechanism described above progresses, the metal is expected to promote dehydrogenation and hydrogenation in the catalyst of the present disclosure.

It is also expected that the metal may also contribute to preventing, deactivation of the catalyst. Although not being bound by any particular theory, when a SRO reaction progresses, in the case when a reaction following the SRO reaction mechanism described above is performed, side reactions described below may also occur.

[Side-Reaction] Adsorption Reaction Mechanism

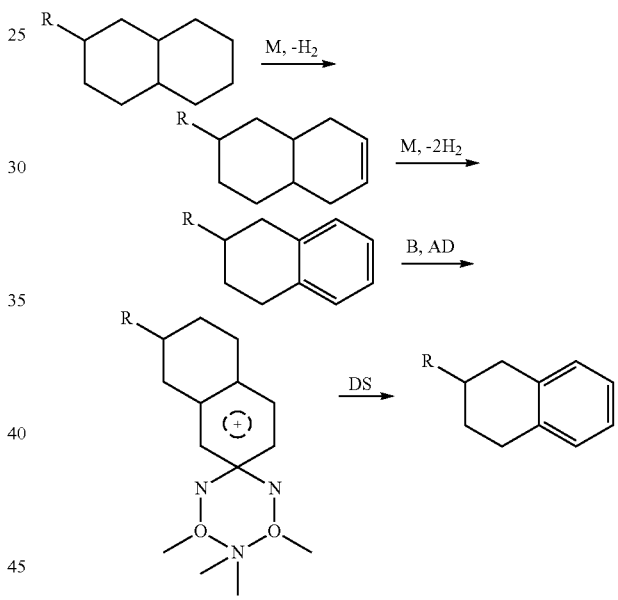

(Catalysts. 10(4) (20020) 393)
(Nature Catalysis, 1 (2018) 23)

M: Metal, B: Bronsted Acid, DS: Desorption

As with SRO reactions, the side reactions also occur at the active site of the solid acid material, and due to such adsorption, the catalyst can theoretically be deactivated. However, since the catalyst of the present disclosure may include both of the metal and the solid acid material, the metal may promote a hydrogenation reaction, thereby facilitating a desorption reaction to cause a material adsorbed tin the solid acid material to be desorbed.

According to one embodiment of the present disclosure, the catalyst may comprise the metal in an amount of 0.05% to 5% by weight, based on the total weight of the catalyst. Preferably, the catalyst may comprise the metal in an amount of 0.1% to 3% by weight, and more preferably in an amount of about 0.2% to 1% by weight. When the content of the metal is less than about 0.05% by weight, since the content of the metal contained in the catalyst is too low, the function of the metal cannot be sufficiently performed. Particularly, there may be a problem in that the catalyst is deactivated in a very short time of use of the catalyst. On the other hand, when the content of the metal exceeds 5% by weight, the hydrogenation reaction is excessively promoted, resulting in reduction in the efficiency of the SRO reaction, or resulting in the clogging of the solid acid active site in the solid acid material by the metal.

According to one embodiment of the present disclosure, in the catalyst of the present disclosure, the pores of the catalyst corresponding to about 20% or more of the pore volume of the entire pore volume of the catalyst may have a pore size of about 10 nm or more. The pores corresponding to, preferably at least about 30%, more preferably at least about 50%, even more preferably at least about 70%, yet even more preferably at least about 80%, and most preferably at least about 85%, of the total pore volume of the catalyst may have a pore size of about 10 nm or more. The pores corresponding to about 90% of the total pore volume may have such a pore size, preferably, the pore size may be about 50 nm or more, and more preferably about 100 nm or more. The upper limit of the pore size range may be about 1,000,000 nm. The catalyst of the present disclosure includes a specific percentage of the pores having a size larger than or equal to a specific nanometer, thereby enabling SRO reactions of bulky multiple-ring compounds. When the catalyst has a pore distribution below the levels listed above, it will be difficult to expect an improvement in the VI to be achieved by the catalyst of the present disclosure.

In one embodiment of the present disclosure, the catalyst comprising the non-acidic binder may comprise, with respect to 100 parts by weight of the second solid acid material, about 10 to 100 parts by weight of the first solid acid material and about 10 to 100 parts by weight of the non-acidic binder. Preferably, the catalyst may comprise about 30 to 90 parts by weight, more preferably about 40 to 80 parts by weight, more preferably about 50 to 70 parts by weight of the first solid acid material, relative to 100 parts by weight of the second solid acid material. Preferably, the catalyst may comprise about 20 to 80 parts by weight, more preferably about 20 to 60 parts by weight, more preferably about 30 to 50 parts by weight of the non-acidic binder, relative to 100 parts by weight of the second solid acid material. When the content of the first solid acid material and the non-acidic binder falls outside of this range, the problem of decreasing the yield of the lube base oil may arise due to the degradation at the time of the reaction. In particular, when the content of the non-acidic binder is lower than the lower limit of the above-mentioned range, a problem that the catalyst breaks in harsh reaction environments due to insufficient strength of the catalyst prepared may occur.

According to one embodiment of the present disclosure, the catalyst of the present disclosure may further comprise a promoter as needed. The promoter may be included for the purpose of modulating the reaction activity of the metal included in the catalyst. The promoter may be an alkali metal, an alkaline earth metal, a Group Vb metal, a Group VIb metal, Sn, or a combination thereof. In the present disclosure, the promoter may preferably comprise Mg, Ca, or a combination thereof. In one embodiment of the present disclosure, the content of the promoter in the catalyst of the present disclosure may be in a range of from about 1% to 10% by weight, based on the total weight of the catalyst.

The Catalyst for SRO reactions of the present disclosure may be used in the methods described below.

Method for Increasing VI of Lube Base Oils

The present disclosure also provides a method of increasing the VI of a lube base oil by using the catalyst described above. The method comprises subjecting a reactant to a SRO reaction in the presence of the catalyst for SRO reactions. According to one embodiment of the present disclosure, the reactant comprises: a feed for the preparation of a lube base oil; an intermediate oil in a lube base oil preparation process; or a lube base oil. Preferably the reactant may be a feed for the preparation of a lube base oil; or an intermediate oil in a lube base oil preparation process. Most preferably the reactant may be an intermediate oil in a lube base oil preparation process.

The intermediate oil refers to an oil that is produced when a feed for the preparation of a lube base oil has passed through at least one reactor and which is present before entering the hydrofinishing reaction. For example, the intermediate oil in the present disclosure may be an oil present before or after a HDW reaction.

According to one embodiment of the present disclosure, the reactant may be an oil comprising a cyclic hydrocarbon compound. The reactant may satisfy the condition of 5% by weight $\leq C_N+C_A<100\%$ by weight, and preferably the conditions of $C_P>50\%$ by weight and 20% by weight $\leq C_N+C_A\leq 50\%$ by weight.

Here, $C_P$ represents the content of paraffins, $C_N$ represents the content of naphthene, and $C_A$ represents the content of aromatic compounds. In the present disclosure, the $C_A$ of the reactants may be 5% by weight or less and preferably 1% by weight or less.

According to one embodiment of the present disclosure, the SRO reaction may be carried out in the presence of hydrogen at a temperature in the range of from 100° C. to 450° C. The reaction conditions except for the catalyst and temperature may be the same as the process conditions of a conventional HDW process.

According to one embodiment of the present disclosure, the VI of the lube base oil having undergone the method is greater than the VI of the lube base oil having not undergone the method by at least 5. Preferably, the VI difference between the lube base oils may be greater than or equal to 8 and more preferably greater than or equal to 10.

Method of Preparing Lube Base Oil

The present disclosure provides a method of preparing a lube base oil by using the catalyst described above. The method comprises the steps of a) preparing a feed; b) introducing the feed into any one of a HDW reaction and a SRO reaction; and c) introducing the reaction product of step b) into the remaining one of the HDW reaction and the SRO reaction. Here, the SRO reaction is carried out in the presence of the catalyst of the present disclosure described above.

The feed in the present disclosure is not particularly limited if it can be used as raw materials in conventional lube base oil preparation processes. The feed in the present disclosure may comprise oils that contain a lot of naphthene and aromatic compounds that have been difficult to use as raw materials in conventional lube base oil preparation processes for high-quality lube base oils such as Group IR or higher lube base oils.

According to one embodiment of the present disclosure, the feed may be an oil comprising a cyclic hydrocarbon compound. The reactant may satisfy the condition of 5% by weight $\leq C_N+C_A<100\%$ by weight, and preferably the conditions of $C_P>50\%$ by weight and 20% by weight $\leq C_N+C_A\leq 50\%$ by weight. Here, $C_P$ represents the content of paraffins, $C_N$ represents the content of naphthene, and $C_A$ represents the content of aromatic compounds. In the present disclosure, the $C_A$ of the reactants may be 5% by weight or less, and preferably 1% by weight or less.

In the present disclosure, the HDW reaction refers to a reaction in which a wax component, such as n-paraffin, is isomerized to iso-paraffin, thereby removing the wax component. The HDW reaction may reduce the pour point of a lube base oil, thereby improving the low temperature performance of the lube base oil. FIG. 2 is a schematic illustration of structural changes in hydrocarbon compounds at each stage when a lube base oil preparation method according to one embodiment of the present disclosure is performed according to the defined sequence. According to one embodiment of the present disclosure, as shown in FIG. 2, the feed may first be introduced into a HDW reaction and then be introduced into a SRO reaction. According to another embodiment of the present disclosure, the feed may first be introduced into the SRO reaction and then be introduced into the HDW reaction. As can be seen from FIG. 2, both reactions are independent of each other in the point that the HDW reaction uses n-paraffins as the main reactants, and the SRO reaction uses cyclic hydrocarbon compounds such as naphthene and aromatic compound as the main reactants. Therefore, it does not matter that the order in which the reactions are performed is reversed. On the other hand, in general, the HDW reaction is carried out under harsher reaction conditions than the SRO reaction. Therefore, in terms of the yield of the production of a lube base oil, desirably, the HDW reaction and the SRO reaction are separately performed. In addition, in terms of the yield of the production of a lube base oil, more preferably, the SRO reaction is subsequent to the HDW reaction. This is because when the SRO reaction is performed after a small amount of aromatic compounds, impurities, and the like present in the feed are removed by the HDW reaction, side reactions attributable to the cracking are minimized, so that the loss in production yield can be prevented.

In the present disclosure, the reaction conditions of the HDW reaction may be the same as the reaction conditions of conventional HDW reactions and may not be particularly limited. According to one embodiment of the present disclosure, the HDW reaction is performed under conditions of a reaction temperature of 250° C. to 410° C., a reaction pressure of 30 to 200 kg/cm², a space velocity (LHSV) of 0.1 to 3.0 hr⁻¹, and a volumetric ratio of hydrogen to the feed of 150 to 1000 Nm³/m³.

The catalyst that can be used in the HDW reaction comprises: a carrier having an acid site; and one or more hydrogenating metals selected from the elements of Groups 2, 6, 9 and 10 in the Periodic table. In particular, among the metals in Groups 9 and 10 (i.e., Group VIII metals), Co, Ni, Pt, and Pd are preferably used, and among the metals in Group 6 (i.e., Group VIB metals), Mo and W are preferably used. The types of carriers having acid sites comprise molecular sieves, alumina, silica-alumina, and the like. Among these, the molecular sieves refer to crystalline aluminosilicates (zeolite), SAPO, ALPO, and the like. A medium-pore molecular sieve with a 10-membered oxygen ring, such as SAPO-11, SAPO-41, ZSM-11, ZSM-22, ZSM-23, ZSM-35, or ZSM-48 may be used, and a large-pore molecular sieve with a 12-membered oxygen ring may be used.

In the lube base oil preparation method according to the present disclosure, the reaction conditions of the SRO reaction may be the same as the reaction conditions of the SRO reaction used in the method of increasing the VI of a lube base oil described above.

As shown in FIG. 2, according to one embodiment of the present disclosure, the preparation method may further comprise introducing the reaction product of step c) into a hydrofinishing reaction. The hydrofinishing reaction may remove olefins and residual polycyclic aromatic compounds in the oil to ensure the stability of the prepared lube base oil.

In the present disclosure, the reaction conditions of the hydrofinishing reaction may be the same as the reaction conditions of conventional hydrofinishing reactions and may not be particularly limited. According to one embodiment of the present disclosure, the hydrofinishing reaction is performed under conditions of a reaction temperature of 250° C. to 300° C., a reaction pressure of 30 to 200 kg/cm², a space velocity (LHSV) of 0.1 to 3 h⁻¹, and a volumetric ratio of hydrogen to feed of 300 to 1500 Nm³/m³.

In addition, a catalyst used for the hydrofinishing reaction may be a catalyst in which a metal is supported on a carrier. The metal comprises one or more metals selected from Group 6, Group 8, Group 9, Group 10, and Group 11 elements having a hydrogenation function. Preferably, a metal sulfide of Ni—Mo, Co—Mo, or Ni—W, or a noble metal such as Pt or Pd may be used. In addition, the carrier of the catalyst used for the hydrofinishing reaction may be silica, alumina, silica-alumina, titania, zirconia, or zeolite, each of which has a large surface area. Preferably, alumina or silica-alumina may be used.

According to one embodiment of the present disclosure, the feed may be introduced into the HDW reaction first, and a HDW reaction product may then be introduced into the SRO reaction and the hydrofinishing reaction at the same time. The SRO reaction and the hydrofinishing reaction may be carried out under similar reaction conditions except for the catalyst. In this case, there is an advantage that it becomes possible to carry out the method of the present disclosure using an conventional hydrofinishing reactor without the addition of a new reactor in a conventional lube base oil preparation plant comprising a HDW reactor and a hydrofinishing reactor.

According to one embodiment of the present disclosure, the preparation method may further comprise fractionating the reaction products to separate lube base oils having desired specifications after the hydrofinishing reaction.

According to one embodiment of the present disclosure, the VI of the lube base oil prepared by the lube base oil preparation method of the present disclosure is greater than the VI of the lube base oil prepared by a conventional lube base oil preparation method in which no SRO reaction is carried out by at least 5. Preferably, the VI difference may be greater than or equal to 8 and more preferably greater than or equal to 10. Hereinafter, preferred examples are presented to help the understanding of the present disclosure, but the following examples are provided only for easier understanding of the present disclosure, and thus the present disclosure is not limited thereto.

EXAMPLE

1. Preparation of Catalyst for SRO Reaction
(1) Sample 1

USY zeolite, kaolin clay, and pseudo-boehmite as a binder were mixed in a weight ratio of about 30:50:20 and then co-mulled. Subsequently, the mixture of the zeolite, clay, and binder was impregnated with an aqueous solution of [Pt(NH₃)₄](NO₃)₂ such that the content of Pt became 0.1% by weight, based on the total weight of the catalyst, and then the impregnated mixture underwent forming. The formed mixture was then dried at a temperature of about 120° C. for about 3 hours and calcined at about 500° C. for about 3 hours. A catalyst thus obtained was referral to as Sample 1.

(2) Sample 2

A catalyst that is not impregnated with Pt was prepared using the same preparation method for Sample 1 except for the impregnation step. A catalyst thus obtained was referred to as Sample 2.

(3) Sample 3

ZSM-48 zeolite and pseudo-boehmite as a binder were mixed in a weight ratio of about 1:1 and then co-mulled Subsequently, the mixture of the zeolite and the binder was impregnated with an aqueous solution of $[Pt(NH_3)_4](NO_3)_2$ such that the content of Pt became 0.5% by weight, based on the total weight of the catalyst, and then the impregnated mixture underwent forming. The formed mixture was then dried at a temperature of about 120° C. for about 3 hours and calcined at about 500° C. for about 3 hours. A catalyst thus obtained was referred to as Sample 3.

2. Measurement of Physical Properties of Catalysts

The physical properties of Samples 2 and 3 were measured using a Hg porosity meter, and the results are shown in Table 2 below.

TABLE 2

|  | Sample 2 (Condition of pressure ranging from 0.20 to 61,000.00 psia) | Sample 3 (Condition of pressure ranging from 0.10 to 60,000.00 psia) |
| --- | --- | --- |
| Total pore volume (mL/g) | 0.71 | 0.35 |
| Total pore area (m²/g) | 14.64 | 178.91 |
| Median pore diameter-volume (nm) | 21109.81 | 7.80 |
| Median pore diameter-area (nm) | 24.02 | 7.60 |
| Average pore size-4 V/A (nm) | 193.01 | 7.80 |
| Bulk density (g/mL) | 0.81 | 1.20 |
| Apparent density (g/mL) | 1.90 | 2.06 |
| Porosity (%) | 57.29 | 41.89 |

Figure 3:
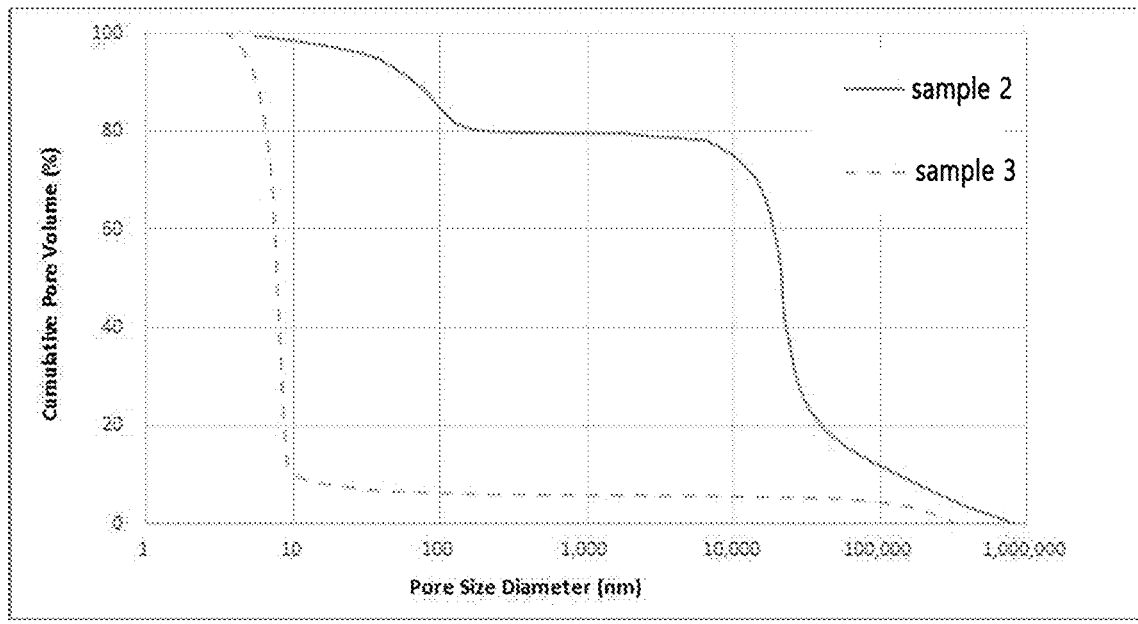
FIG. 3 is a graph illustrating measurements of pore size distribution of a catalyst according to an example of the present disclosure.

The pore size distributions of Samples 2 and 3 were also analyzed with a Hg porosity meter (MicroActive AutoPore V 9600), and the results are shown in FIG. 3.

In the case of Sample 2, with respect to a total pore volume of 0.71 mug, it was confirmed that the pore volume of the pores with sizes of 100 nm or more accounts for about 85%. On the other hand, in the case of Sample 3, with respect to a total pore volume of 0.35 mug, it was confirmed that the pore volume of the pores having sizes of 100 nm or more accounts for about 6% or less.

3. SRO Reaction Experiment (1) Comparative Experimental Example 1

Feeds were sequentially introduced into an HDW reaction and an HDF reaction to prepare a lube base oil. The reaction conditions were as shown in Table 3 below. The properties of the prepared lube base oil are shown in Table 4.

(2) Experimental Example 1

Feeds were sequentially introduced into an HDW reaction, an SRO reaction, and an HDF reaction to prepare a lube base oil. The SRO reaction was carried out in the presence of the catalyst of Sample 2, and the reaction conditions were as shown in Table 3. The properties of the prepared lube base oil are shown in Table 4.

(3) Experimental Example 2

A lube base oil was prepared in the same manner as in Experimental example 1 except that the reaction temperature of the SRO reaction was changed to 280° C. The reaction conditions were as shown in Table 3 below. The properties of the prepared lube base oil are shown in Table 4.

(4) Comparative Experimental Example 2

A lube base oil was prepared in the same manner as in Experimental example 1 except that the reaction temperature of the SRO reaction was changed to 320° C., and the SRO reaction was performed in the presence of the catalyst of Sample 3. The reaction conditions were as shown in Table 3 below. The properties of the prepared lube base oil are shown in Table 4.

TABLE 3

|  | Comparative experimental example 1 | Experimental example 1 | Experimental example 2 | Comparative experimental example 2 |
| --- | --- | --- | --- | --- |
| Feed | 100 D Kinematic viscosity (at 40° C.) = 17.63 cSt Kinematic viscosity (at 100° C.) = 4.024 cSt | | | |
| $H_2$ partial pressure | 160 kgf/cm² | | | |
| LHSV | HDW catalyst: 1.2/h, SRO Catalyst: 1.0/h HDF catalyst: 1.2/h | | | |
| $H_2$/Oil ratio | 500 NM³/kl | | | |
| HDW reaction temperature | 320° C. | 320° C. | 320° C. | 320° C. |
| SRO reaction temperature | — | 250° C. | 280° C. | 320° C. |
| SRO catalyst | — | Sample 2 | Sample 2 | Sample 3 |
| HDW reaction temperature | 230° C. | 230° C. | 230° C. | 230° C. |

TABLE 4

|  | Comparative experimental example 1 | Experimental example 1 | Experimental example 2 | Comparative experimental example 2 |
| --- | --- | --- | --- | --- |
| Kinematic viscosity (at 40° C.), cSt | 18.80 | 17.70 | 17.53 | 19.1 |
| Kinematic viscosity (at 100° C.), cSt | 4.098 | 4.013 | 4.126 | 4.08 |
| VI | 120 | 129 | 143 | 115 |
| Pour point, ° C. | −19 | −18 | −18 | −33 |
| Yield, % | 91 | 88 | 89 | 86 |

Referring to Comparative experimental examples 1 and 2 in Table 4, the lube base oil prepared in Comparative experimental example 1 in which the SRO reaction was not performed exhibits a higher VI than the lube base oil prepared in Comparative experimental example 2 in which the SRO reaction was performed in the presence of the catalyst of Sample 3. It can also be seen that the pour point of the lube base oil prepared in Comparative experimental example 2 is lower. It appears that since the catalyst of Sample 3 had fewer pores with large pore sizes of 10 nm or more, the ring-opening reaction of bulky multiple-cyclic hydrocarbon compounds cannot be promoted. Rather, considering the results of Comparative experimental example 2, it is considered that the catalyst of Sample 3 promoted the cracking reaction in the oil.

On the other hand, referring to the results of Experimental examples 1 and 2, it can be seen that since the SRO reaction was performed in the presence of the catalyst of Sample 2, the VI was increased compared to the case of Comparative experimental example 1. Given the results of the pore size distribution in FIG. 3, it is considered that since in the case of the catalyst of Sample 2, the proportion of the pore volume of the pores having pore sizes of 10 nm or more is 20% or more with respect to the total pore volume of the catalyst of Sample 2, the catalyst promoted the ring opening reaction of cyclic hydrocarbon compounds having two or more rings 4. Comparison of Composition Between Prepared Lube Base Oils The composition of each of the lube base oils prepared in Comparative experimental example 1 and Experimental example 1, respectively was analyzed. The analysis result is shown in Table 5 below.

TABLE 5

|  | Comparative experimental example 1 | Experimental example 1 |
| --- | --- | --- |
| VI | 120 | 129 |
| Iso-paraffin | 58.9% by weight | 62.2% by weight |
| 1-ring naphthene | 30.9% by weight | 29.7% by weight |
| 2-ring naphthene | 6.2% by weight | 4.9% by weight |
| 2-ring naphthene | 2.6% by weight | 2.4% by weight |
| 4-ring + naphthene | 1.3% by weight | 0.9% by weight |

Referring to Table 5 above, it can be seen that the naphthene content in the lube base oil decreased and the iso-paraffin content increased through the SRO reaction. In particular, cyclic hydrocarbon compounds having two or more rings have a significant impact on VI improvement even with a slight reduction in the amount of the compounds. Therefore, it is expected that SRO reaction using the catalyst of the present disclosure will be highly advantageous in terms of improvement of the VI of a lube base oil.

5. Discussion of Activity of Catalyst Over Time

The same feed as in Experimental example 1 was sequentially introduced into an HDW reaction, an SRO reaction, and an HDF reaction to prepare a lube base oil over 10 days. The catalysts of Sample 1 and Sample 2 were used as catalysts for the SRO reaction. The kinematic viscosity of each of the lube base oils prepared was measured from day 2 at 1-day intervals. The results are shown in FIG. 4.

Figure 4:
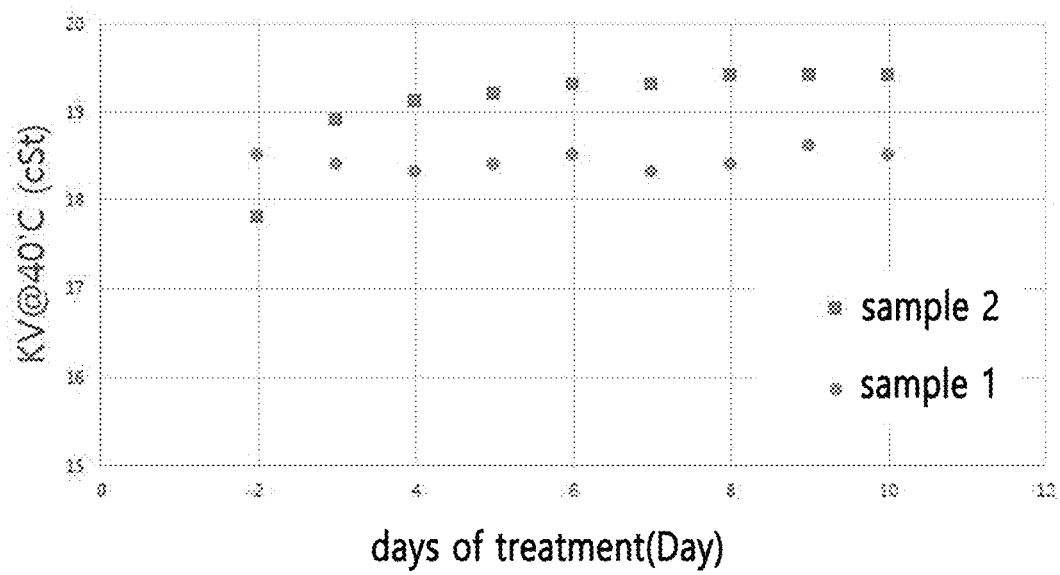
FIG. 4 is a chart illustrating changes in viscosity of a lube base oil according to the number of days of treatment, measured according to one example of the present disclosure.

Referring to FIG. 4, when the catalyst of Sample 2 was used, the kinematic viscosity gradually increased as the number of days of treatment increased, and thus the VI value decreased (KV at 40° C.=17.80 cSt, KV at 100° C.=4.011 cSt, VI=127, KV at 40° C.=19.43 cSt, KV at 100° C.=4.228 cSt, and VI=124).

On the other hand, when the catalyst of Sample 1 was used, it can be seen that the kinematic viscosity and the VI were maintained regardless of the number of days of treatment (in the case of using the catalyst of Sample 1, KV at 40° C.=18.40 cSt, KV at 100° C.=4.123 cSt, VI=128 for the reaction products of day 2 and day 10).

The above results reveal that the metal in the catalyst also performs a function of inhibiting the deactivation of a ring-opening reaction catalyst.

All simple modifications and alterations of the present disclosure fall within the scope of the present disclosure, and the specific protection scope of the present disclosure will be clearly defined by the appended claims.

What is claimed is:

1. A catalyst for selective ring-opening (SRO) reactions, the catalyst comprising:
    a solid acid material; and
    a metal,
    wherein pores corresponding to a 50% or more pore volume with respect to the total pore volume of the catalyst have a pore size of 100 nm or more.

2. The catalyst of claim 1, wherein the solid acid material comprises a first solid acid material and a second solid acid material, the first solid acid material has a pore size of 1 nm or less, and the second solid acid material has a pore size greater than 1 nm.

3. The catalyst of claim 2, wherein the first solid acid material comprises a zeolite, crystalline aluminosilicate, silica-alumina-phosphate (SAPO), aluminum phosphate (AlPO), a metal organic framework (MOF), or a combination thereof.

4. The catalyst of claim 2, wherein the second solid acid material comprises silica-alumina (ASA, amorphous silica-alumina), clay, sulfated zirconia, zirconia, titania, niobia, alumina, silica, or a combination thereof.

5. The catalyst of claim 1, wherein the metal is a Group VIII metal.

6. The catalyst of claim 1, wherein the catalyst comprises the metal in an amount of 0.05% to 5% by weight with respect to the total weight of the catalyst.

7. The catalyst of claim 2, wherein the catalyst further comprises a non-acidic binder.

8. The catalyst of claim 7, wherein the catalyst comprises, with respect to 100 parts by weight of the second solid acid material, 10 to 100 parts by weight of the first solid acid material and 10 to 100 parts by weight of the non-acidic binder.

9. The catalyst of claim 1, wherein the catalyst further comprises a promoter, and the promoter comprises an alkali metal, an alkaline earth metal, a Group Vb metal, a Group VIb metal, Sn, or a combination thereof.

10. A method of increasing a viscosity index (VI) of a lube base oil, the method comprising:
    subjecting a reactant to a SRO reaction in the presence of the catalyst of claim 1.

11. The method of claim 10, wherein the reactant comprises:
    a feed for preparation of a lube base oil;
    an intermediate oil in a lube base oil preparation process; or
    a lube base oil.

12. The method of claim 10, wherein the SRO reaction is carried out in the presence of hydrogen within a temperature range of 100° C. to 450° C.

13. A method of preparing a lube base oil, the method comprising:
    a) preparing a feed;
    b) introducing the feed into any one of a hydrodewaxing reaction (HDW) or a SRO reaction;
    c) introducing the reaction product of step b) into the remaining one of the HDW reaction and the SRO reaction,
    wherein the SRO reaction is carried out in the presence of the catalyst of claim 1.

14. The method of claim 13, further comprising d) introducing the reaction product of step c) into a hydrofinishing reaction.

15. The method of claim 13, wherein the VI of the lube base oil prepared by the method of claim 13 is greater than the VI of a lube base oil prepared by a method in which no SRO reaction is carried out by at least 5.

\* \* \* \* \*